(12) United States Patent
Thoresson

(10) Patent No.: US 8,165,564 B2
(45) Date of Patent: Apr. 24, 2012

(54) EMOTIONAL COMMUNICATION BETWEEN PORTABLE EQUIPMENTS

(75) Inventor: Johan Thoresson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 445 days.

(21) Appl. No.: 11/303,150

(22) Filed: Dec. 16, 2005

(65) Prior Publication Data

US 2007/0142042 A1 Jun. 21, 2007

Related U.S. Application Data

(60) Provisional application No. 60/749,568, filed on Dec. 12, 2005.

(51) Int. Cl.
*H04W 4/00* (2009.01)
(52) U.S. Cl. .................. 455/411; 455/519; 455/566
(58) Field of Classification Search .................. 455/418, 455/419, 420, 411, 519, 566
See application file for complete search history.

(56) References Cited

U.S. PATENT DOCUMENTS

| | | | |
|---|---|---|---|
| 6,411,198 B1 | 6/2002 | Hirai et al. | |
| 6,728,547 B1 | 4/2004 | Frank et al. | |
| 7,158,805 B1 * | 1/2007 | Park et al. | 455/519 |
| 2002/0133552 A1 * | 9/2002 | Ooi et al. | 709/205 |
| 2004/0235424 A1 | 11/2004 | Kim | |
| 2005/0216529 A1 * | 9/2005 | Ashtekar et al. | 707/203 |

FOREIGN PATENT DOCUMENTS

| | | |
|---|---|---|
| EP | 0 825 751 A1 | 2/1998 |
| EP | 1 416 701 A1 | 5/2004 |
| WO | 2004/014052 A1 | 2/2004 |

OTHER PUBLICATIONS

International Search Report and Written Opinion for corresponding International Application No. PCT/EP2006/005112 mailed Jul. 19, 2007.
International Preliminary Report on Patentability for corresponding International Application No. PCT/EP2006/005112 dated Nov. 28, 2007.

* cited by examiner

*Primary Examiner* — Pierre-Louis Desir
(74) *Attorney, Agent, or Firm* — Renner, Otto, Boisselle & Sklar, LLP

(57) ABSTRACT

The present invention relates to a possibility of communicating emotional information between a first and a second portable equipment. A first portable equipment for communication in a wireless communication system comprises an input portion adapted to receive information input by a user, an editing portion adapted to edit settings of a second portable equipment in response to a user input and to generate corresponding setting information, and a transmitting portion adapted to transmit setting information generated by the editing portion to the second portable equipment in said wireless communication system. A second portable equipment for communication in a wireless communication system comprises a receiving portion adapted to receive setting information from the first portable equipment in a wireless communication system, and a control portion adapted to change settings of the second portable equipment depending on received setting information and to output an indication signal to a user to the changed settings.

11 Claims, 2 Drawing Sheets

EMOTIONAL COMMUNICATION BETWEEN PORTABLE EQUIPMENTS

This application claims priority to the Provisional Application No. 60/749,568, filed on Dec. 12, 2005, titled, Emotional Communication Between Portable Equipments.

TECHNICAL FIELD OF THE INVENTION

The present invention relates to the communication between portable equipments, particularly to possibilities of rendering the wireless communication between two or more portable equipments more emotional as compared to known communication possibilities.

DESCRIPTION OF RELATED ART

It is known that portable equipments for wireless communication, such as mobile phones, personal digital assistants and the like are personalized by the respective user with specific and personal settings which express the user's emotions for something or somebody the user cares about. For example, a user may select a specific wallpaper or background image from a choice provided by the portable equipment, by a data base of an internet provider or by using pictures taken with a camera installed in the portable equipment or downloaded from a computer, a server or the like. For example, a parent may choose a picture of his/her child or children, a husband may choose a picture of his wife, a girl may choose a picture of her boyfriend and so forth. Further, a fan of a rock/pop group or musician may choose a picture of his/her idol or a soccer fan may choose the logo of his/her favourite team. Another example of a setting which may reflect the user's emotion is a specific ring tone that the user has selected, recorded, downloaded or the like into the portable equipment, whereby the melody or sound of the ring tone has some emotional value for the user.

However, the above described possibilities of adapting the setting of a portable equipment to a personal reference can only be done by a user directly inputting corresponding instructions into the portable terminal via a keypad or the like.

At the moment, there is no specific technology available which enables the exchange of emotional information between the users of two or more portable equipments which would like to express their respective emotions to each other. The normal communication possibilities provided by portable equipments, such as text, voice, pictures and video communication base on the same communication exchange for everybody, so that the recipient of such communication does not feel like being treated in some special manner. People who are emotionally linked to each other, usually like to communicate with each other as often as possible even if they are in different locations. In some countries, people exchange a small sign of life with each other using portable equipments by just letting the other portable equipment ring once which is an indication that the caller thinks of the recipient. However, this method is only a replacement in lack of any better way of communicating emotional information.

SUMMARY

The object of the present invention is therefore to provide a possibility of exchanging emotional information between two ore more portable equipments in a wireless communication system in a simple but effective manner.

The above object is achieved by a first a portable equipment for communication in a wireless communication system, comprising an input portion adapted to receive information input by a user, an editing portion adapted to edit settings of a second portable equipment in response to a user input and to generate corresponding setting information, and a transmitting portion adapted to transmit setting information generated by the editing portion to the second portable equipment in said wireless communication system.

Advantageously, the first portable equipment further comprises a control portion adapted to control the exchange of identification information with said second portable equipment in order to enable the editing portion to edit the settings of said second portable equipment. Hereby, the exchange of identification information with said second portable equipment may take place in the same wireless communication system the portable equipments are adapted to communicate said setting information or in a different communication system.

Further advantageously, in said first portable equipment, the receiving portion is adapted to receive setting information from said second portable equipment in a wireless communication system, and said control portion is adapted to change settings of the first portable equipment depending on received setting information and to output an indication signal to a user corresponding to the changed settings.

The above object is further achieved by a second portable equipment for communication in a wireless communication system, comprising a receiving portion adapted to receive setting information from a first portable equipment in the wireless communication system, and a control portion adapted to change settings of the second portable equipment depending on received setting information and to output an indication signal to a user corresponding to the changed settings.

Further advantageously, in said second portable equipment, the control portion is further adapted to control the exchange of identification information with said first portable equipment in order to be able to change the settings of the second portable equipment depending on setting information received from said first portable equipment. Hereby, the exchange of identification information with said first portable equipment may take place in the same wireless communication system the portable equipments are adapted to communicate said setting information or in a different communication system.

Further advantageously, said second portable equipment comprises an input portion adapted to receive information input by a user, an editing portion adapted to edit settings of a first portable equipment in response to a user input and to generate corresponding setting information, and a transmitting portion adapted to transmit setting information generated by the editing portion to the first portable equipment in said wireless communication system.

The above object is further achieved by a method for communicating information in a wireless communication system, comprising the steps of receiving information input by a user in a first portable equipment, editing settings of a second portable equipment in response to said user input and generating corresponding setting information in said first portable equipment, transmitting said generated setting information from said first to said second portable equipment in said wireless communication system, receiving said transmitted setting information in the second portable equipment, and changing settings of the second portable equipment depending on said received setting information, and outputting an indication signal to a user corresponding to the changed settings.

Further advantageously, said method further comprises the steps of exchanging identification information between said first and said second portable equipment in said wireless communication system in order to be able to change the settings of the second portable equipment depending on a setting information received from the first portable equipment. Hereby, the exchange of identification information with said first portable equipment may take place in the same wireless communication system the portable equipments are adapted to communicate said setting information or in a different communication system.

The term portable equipment as used in the present specification refers to all types of mobile and portable devices which are adapted for a communication in a wireless communication system, such as mobile telephones, pagers, communicators, i. e. electronic organizers, smart phones or the like. Further, the term wireless communication system as used in the present specification refers to all kinds of wireless systems which allow the wireless transmission of data, information, instructions and so forth in a wireless manner, for example wireless cellular telecommunication systems, short range or long range communication systems, indoor and outdoor communication systems and so forth. Examples of standards for such wireless communication systems are the GSM system, the GPRS system, the UMTS system, the SMS system, the MMS system, the WIFI system, the WLAN system, Bluetooth systems, infrared systems, NFC systems, and any other kind of suitable wireless communication system. The term communication system may include wireless communication systems as described above and/or wired communication systems in which tow equipments are connected and exchange information via a cable.

It should be emphasized that the term 'comprises/comprising' when used in the specification is taken to specify the presence of stated features, integers, steps or components but does not preclude the presence or addition of one or more other features, integers, steps or groups thereof.

The specific merits of the present invention are that it enables an exclusive, playful, romantic and subtle possibility and implementation of an emotional communication between people that care for each other using portable equipments.

BRIEF DESCRIPTION OF THE DRAWINGS

The present invention will be explained in further detail in the following description of a preferred embodiment in relation to the enclosed drawings, in which.

DETAILED DESCRIPTION OF EMBODIMENT

Figure 1:
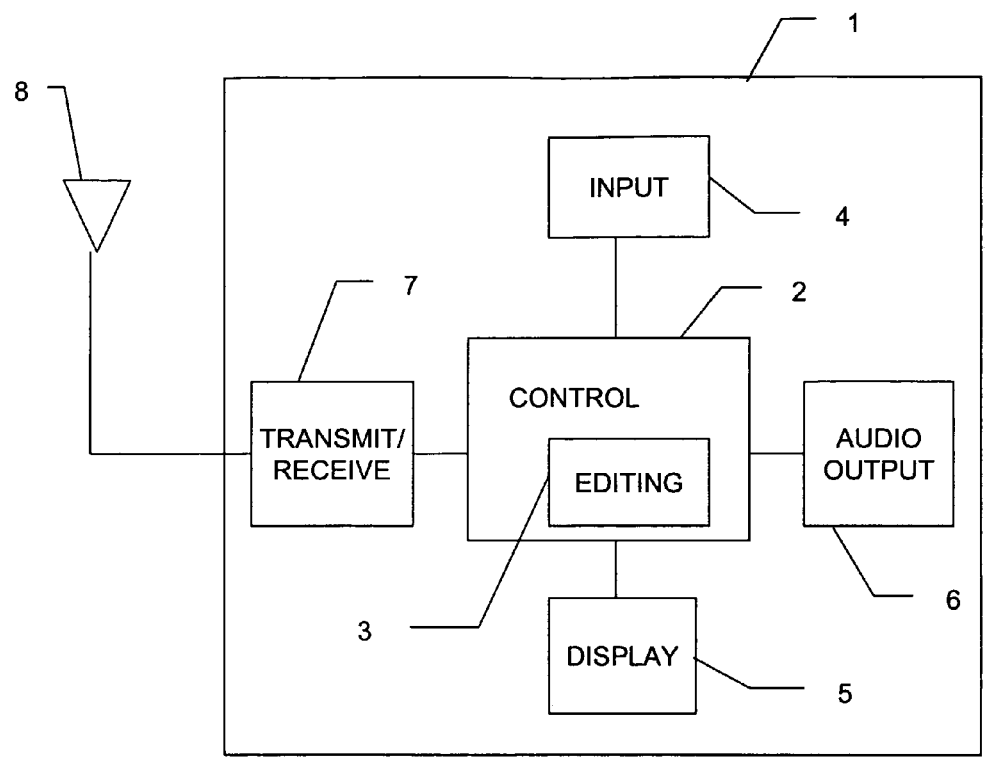
FIG. 1 shows a schematic block diagram of a first portable equipment according to the present invention.

FIG. 1 shows a schematic block diagram of a first portable equipment 1 according to the present invention. The portable equipment 1 is adapted and contains all necessary elements and functionalities for a communication of data in a wireless communication system, whereby only the elements necessary for understanding the present invention are shown. The portable equipment 1 comprises a control portion 2, which is for example embodied in a microprocessor, a central processing unit or the like. The control portion 2 controls the functionalities and the elements of the portable equipment and particularly comprises an editing portion 3 which is adapted to edit settings of the first portable equipment 1 in response to corresponding user input via an input portion 4 connected with the control portion 2. The input portion 4 is for example a keypad, a keyboard or the like. The control portion 2 is further connected to a display 5 which displays information and data to a user. Additionally, the portable equipment 1 comprises an audio output portion 6, such as loudspeakers or the like, which are also connected to and controlled by the control portion 2. In order to communicate data and information in a wireless communication system, the portable equipment 1 comprises a transmitting and receiving portion 7 which is controlled by and connected to the control portion 2 and which is adapted to transmit and receive signals in a wireless communication system through a corresponding wireless interface, which is for example an antenna 8.

Figure 2:
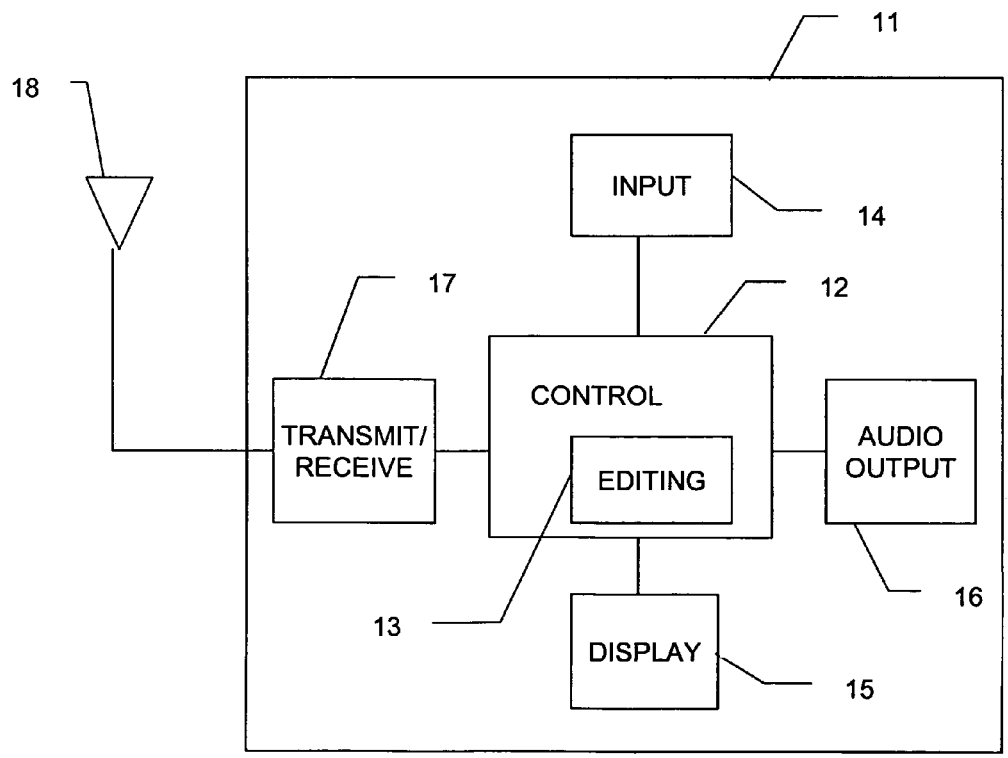
FIG. 2 shows a schematic block diagram of a second portable equipment according to the present invention.

FIG. 2 shows a schematic block diagram of a second portable equipment 11 according to the present invention. The second portable equipment 11 is adapted for a communication of data and information in the same wireless communication system as the first portable equipment 1 and comprises all necessary elements and functionalities for such a communication, although only the elements necessary to understand the present invention are shown in FIG. 2. The second portable equipment 11 comprises a control portion 12 for controlling the functionalities of the portable equipment 11 in the same way as the control portion 2 of the first portable equipment 1. The control portion 12 also comprises an editing portion 13 adapted to edit settings of the second portable equipment 11 in response to user input via an input portion 14 connected to the control portion 12. The input portion 14 can be a keypad, a keyboard or the like. Further, the second portable equipment 11 comprises a display 15 connected to the control portion 12 which displays information and data to a user. The second portable equipment 11 further comprises an audio output portion 16 connected to the control portion 12, which outputs audio signals to a user and is for example embodied as a loudspeaker or the like. The second portable equipment 11 further comprises a transmitting and receiving section 17 which is connected to the control portion 12 which is adapted to transmit and receive signals in the wireless communication system via a wireless interface, such as antenna 18.

Figure 3:
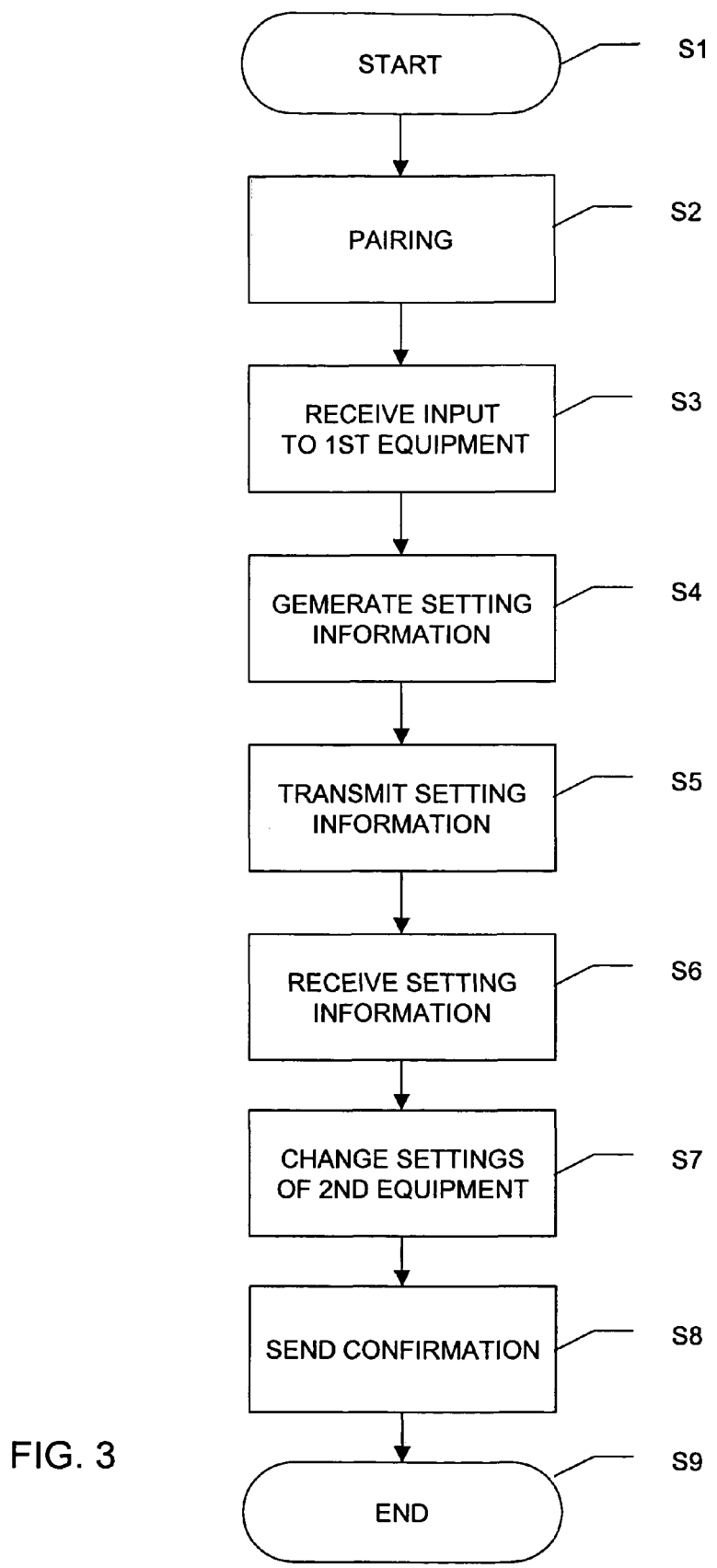
FIG. 3 shows a flow chart with the communication method according to the present invention.

FIG. 3 shows a schematic flow chart of the communication method between the first portable equipment 1 and the second portable equipment 11 according to the present invention.

The first portable equipment 1 generally allows a user to input instructions or information which change and determine the settings of the second portable equipment 11. Hereby, in a subtle and emotional way of a communication between a first user using the first portable equipment 1 and a second user using the second portable equipment 11 can be provided, in that the first user can control the second user's personal settings of the second portable equipment 11 in an easy and simple way. Hereby, the first user can indicate the second user that he or she thinks of him or her in an automated but very individual and exclusive manner. It is to be noted that the term 'settings' as used in the present description comprises all kinds of visible or audible behaviours and settings of a portable equipment, including but not limited to the display of wallpapers, images, pictures on a display portion, the illumination of a keypad or a keyboard with different colours and the like, the output of audio signals upon receiving a phone call, a text message and the like, the arrangement of icons on the display portion and so forth.

The editing portion 3 of the first portable equipment 1 provides a user with the possibility to input and to edit settings of the second portable equipment 11. After a corresponding user input via the input portion 4, the editing portion generates corresponding setting information which is then transmitted via the transmitting and receiving portion 7 and the antenna 8 to the second portable equipment 11. In the second portable equipment 11, the setting information is received via the antenna 18 and the transmitting and receiving portion 17 and forwarded to the control portion 12, which processes the received setting information and automatically changes the corresponding settings of the second portable equipment 11. Before a user can input corresponding instructions to the first portable equipment 1, it is necessary to pair the first portable equipment 1 and the second portable equipment 11. Correspondingly, after a start step S1 as shown in FIG. 3, a pairing step S2 follows. The start step S1 is for example the switching on of both portable equipments 1 and 11 and/or the users' agreement of both portable equipments 1 and 11 to perform a pairing procedure. Hereby, a first user of the first portable equipment 1 for example inputs via the input portion 4 a pairing instruction, for example by choosing a 'make emotional communication connection' option in a menu edited by the editing portion 3. Thereafter, a corresponding pairing request is generated under the control of the control portion 2 and transmitted via the transmitting and receiving portion 7 and the antenna 8 to the second portable equipment 11. The pairing instruction is received via the antenna 18 and the transmitting and receiving portion 17 in the second portable equipment 11 and processed by the control portion 12, which prompts the second user of the second portable equipment 11 by visible and/or audible signals to respond to the pairing request. The second user then inputs a corresponding answer instruction via the input portion 14, which is processed by the control portion 12 into the corresponding response signal which is transmitted via the transmitting and receiving portion 17 and the antenna 18 to the first portable equipment 1. Hereby, the second user can for example additionally choose and determine the specific types and choices of settings which the first user is allowed to influence and to change at a later time point. The corresponding answer instruction is then received via the antenna 8 and the transmitting and receiving portion 7 in the first portable equipment 1 and processed in a control portion 2 by storing corresponding identification data identifying the second portable equipment 11 as the recipient of setting information. Similarly, the control portion 12 stores identification information identifying the first portable equipment 1 as the device which is allowed to send setting information changing the settings of the second portable equipment 11. It is to be understood that the pairing process may include a third or further portable equipments, so that the first user of the first portable equipment 1 can send setting information not only to the second portable equipment 11, but also to a third or further portable equipments in order to simultaneously change their settings.

After finishing the pairing step S2, the first user of the first portable equipment 1 can at any chosen time enter a corresponding menu item displayed on the display 5 of the first portable equipment 1 under the control of the editing portion 3 and edit and change the settings of the second portable equipment via an input of corresponding instructions to the input portion 4. For example, the editing portion 3 may present the user with a predefined choice of settings which the user can select, such as a new image or wallpaper to be displayed on the display 15 of the second portable equipment 11, as for example a picture taken with a camera integrated in the first portable equipment 1 or a prestored or downloaded picture, a new ring tone, a new theme for the second portable equipment 11, the initiation of a vibration alarm in the second portable equipment 11, and the like. Also, the change of settings of the first portable equipment 1 by a user could automatically trigger the editing and generation of corresponding setting information which change the identical settings on the second portable equipment 11.

After the input of corresponding setting instructions in a step S3, the editing portion 3 generates corresponding setting information in a step S4 and the control portion 2 initiates the transmission of a corresponding setting information signal to the second portable equipment 11 or further paired portable equipments in a step S5. After receipt of the setting information signal in the second portable equipment 11 in a step S6, the corresponding setting information is identified in the control portion 12 which then changes the corresponding settings of the second portable equipment 11 in a step S7. For example, if the setting information comprises a new image or wallpaper, this new image or wallpaper is displayed in the display 15. In case that the setting information is related to a new theme, the control portion 12 changes the theme of the second portable equipment 11 correspondingly. In case that the setting information is related to a new ring tone, vibration signal or the like, the control portion 12 activates the corresponding new ring tone, vibration alarm or the like in the second portable equipment 11. In a further example, the setting information might reflect a sequence of keys which are pressed by the first user on the input portion 4 of the first portable equipment 1, so that the control portion 12 controls the corresponding keys comprised in the input portion 14 of the second portable equipment 11, so that the same keys are illuminated in the same sequence in order to convey a message or just a symbol pattern.

After the change of the setting of the second portable equipment 11 is finished, the control portion 12 generates and sends a confirmation signal in a step S8 back to the first portable equipment 1. The procedure is then terminated in step S9 by the first portable equipment receiving the confirmation signal and eventually outputting a corresponding audible or visual signal to the first user.

It is to be noted that the first portable equipment 1 and the second portable equipment 11 can be adapted to communicate not only in one wireless communication system, but also in two or more wireless or wired communication systems. For example, the pairing process could be performed with a short range wireless communication system, such as a Bluetooth system, an infrared system or even a cable connecting both portable equipments 1 and 11, and the transmission of the setting information could be performed using a long distance wireless communication system, such as a wireless cellular telecommunication system. Also, the pairing process and the transmission of the setting information could be performed in the same wireless communication system, such as a wireless cellular telecommunication system.

The invention claimed is:

1. First portable equipment for communication in a wireless communication system, comprising an input portion adapted to receive information input by a user, an editing portion adapted to edit settings of a second portable equipment in response to a user input and to generate corresponding setting information, wherein the editing portion presents a predefined choice of settings from which the user selects to generate the setting information, and a transmitting portion adapted to transmit setting information generated by the editing portion to the second portable equipment in said wireless communication system, wherein the first portable equipment initiates a direct transmission of the setting information to the second portable equipment independent of the second portable equipment; and wherein the setting information comprises an instruction to automatically activate at least one visible or audible behavior of the second portable equipment in response to receipt of the setting information, so as to immediately cause a display in the second portable equipment to display the visible behavior or an audio output in the second portable equipment to output the audio behavior, without the second portable equipment having to retrieve the setting information from an intermediate storage system intermediately storing the setting information.

2. First portable equipment according to claim 1, comprising
a control portion adapted to control the exchange of identification information with said second portable equipment in order to enable the editing portion to edit the settings of said second portable equipment.

3. First portable equipment according to claim 2,
whereby the exchange of identification information with said second portable equipment may take place in the same wireless communication system the portable equipments are adapted to communicate said setting information or in a different communication system.

4. First portable equipment according to claim 1,
whereby said receiving portion is adapted to receive setting information from said second portable equipment in the wireless communication system, and
said control portion is adapted to change settings of the first portable equipment depending on received setting information and to output an indication signal to a user corresponding to the changed settings.

5. Second portable equipment for communication in a wireless communication system, comprising a receiving portion adapted to receive setting information from a first portable equipment in the wireless communication system, wherein the setting information is generated based on a selection from a predefined choice of settings of the second portable equipment, and a control portion adapted to change settings of the second portable equipment depending on the received setting information and to output an indication signal to a user corresponding to the changed settings, wherein a direct transmission of the setting information is initiated by the first portable equipment independent of the second portable equipment; and wherein the setting information comprises an instruction to automatically activate at least one visible or audible behavior of the second portable equipment in response to receipt of the setting information, so as to immediately cause a display in the second portable equipment to display the visible behavior or an audio output in the second portable equipment to output the audio behavior, without the second portable equipment having to retrieve the setting information from an intermediate storage system intermediately storing the setting information.

6. Second portable equipment according to claim 5,
whereby said control portion is further adapted to control the exchange of identification information with said first portable equipment in order to be able to change the settings of the second portable equipment depending on setting information received from said first portable equipment.

7. Second portable equipment according to claim 6,
whereby the exchange of identification information with said first portable equipment may take place in the same wireless communication system the portable equipments are adapted to communicate said setting information or in a different communication system.

8. Second portable equipment according to claim 5, comprising
an input portion adapted to receive information input by a user,
an editing portion adapted to edit settings of a first portable equipment in response to a user input and to generate corresponding setting information, and
a transmitting portion adapted to transmit setting information generated by the editing portion to the first portable equipment in said wireless communication system.

9. Method for communicating information in a wireless communication system, comprising the steps of receiving information input by a user in a first portable equipment, editing settings of a second portable equipment in response to said user input and generating corresponding setting information in said first portable equipment, wherein the settings information is generated based on a user selection from a predefined choice of settings of the second portable equipment, directly transmitting said generated setting information from said first to said second portable equipment in said wireless communication system, receiving said directly transmitted setting information in the second portable equipment, and changing settings of the second portable equipment depending on said received setting information and outputting an indication signal to a user corresponding to the changed settings, wherein the first portable equipment initiates the transmission of the setting information to the second portable equipment independent of the second portable equipment; and wherein the setting information comprises an instruction to automatically activate at least one visible or audible behavior of the second portable equipment in response to receipt of the setting information, so as to immediately cause a display in the second portable equipment to display the visible behavior or an audio output in the second portable equipment to output the audio behavior, without the second portable equipment having to retrieve the setting information from an intermediate storage system intermediately storing the setting information.

10. Method according to claim 9, further comprising the steps of exchanging identification information between said first and said second portable equipment in order to be able to change the settings of the second portable equipment depending on setting information received from said first portable equipment.

11. Method according to claim 10,
whereby the exchange of identification information takes place in the same wireless communication system the portable equipments are adapted to communicate said setting information or in a different communication system.

* * * * *